(12) United States Patent
Abel et al.

(10) Patent No.: US 8,104,264 B2
(45) Date of Patent: Jan. 31, 2012

(54) LOW MINIMUM IMPULSE BIT PROPELLANT GAS THRUSTER

(75) Inventors: Steve Abel, Chandler, AZ (US);
Raymond R. Tseng, Chandler, AZ (US);
Don Christensen, Phoenix, AZ (US);
Bruce Larsen, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 793 days.

(21) Appl. No.: 12/189,642

(22) Filed: Aug. 11, 2008

(65) Prior Publication Data

US 2010/0036579 A1    Feb. 11, 2010

(51) Int. Cl.
*F02K 9/00*    (2006.01)

(52) U.S. Cl. ...... 60/253; 60/204; 251/30.01; 251/30.02; 251/30.05

(58) Field of Classification Search .................. 60/200.1, 60/229, 233, 253; 239/265.25; 244/169
See application file for complete search history.

(56) References Cited

U.S. PATENT DOCUMENTS

| | | | |
|---|---|---|---|
| 3,105,671 A * | 10/1963 | Blatter et al. | 251/30.02 |
| 3,213,611 A * | 10/1965 | Vanderburgh | 60/229 |
| 3,486,517 A * | 12/1969 | Gaura | 137/832 |
| 3,521,653 A * | 7/1970 | Zoya et al. | 137/831 |
| 3,949,774 A | 4/1976 | Morrow | |
| 3,980,002 A | 9/1976 | Jarman et al. | |
| 4,010,770 A | 3/1977 | Peters | |
| 4,531,706 A | 7/1985 | Weiger et al. | |
| 5,301,919 A | 4/1994 | May | |
| 5,899,434 A | 5/1999 | Nishimura | |
| 6,021,808 A | 2/2000 | Dulac | |
| 6,233,919 B1 * | 5/2001 | Abel et al. | 60/204 |
| 6,598,385 B1 * | 7/2003 | Abel et al. | 60/204 |
| 6,962,318 B1 | 11/2005 | Nugent | |
| 7,051,512 B2 * | 5/2006 | Christensen et al. | 60/229 |
| 2005/0120703 A1 * | 6/2005 | Rohrbaugh et al. | 60/229 |
| 2007/0204593 A1 * | 9/2007 | Cover et al. | 60/204 |

* cited by examiner

*Primary Examiner* — Ehud Gartenberg
*Assistant Examiner* — Michael B Mantyla
(74) *Attorney, Agent, or Firm* — Ingrassia Fisher & Lorenz, P.C.

(57) ABSTRACT

A gas thruster is configured to supply thrust over a relatively wide range, from a relatively low value to a relatively high thrust value, and exhibits relatively fine minimum impulse bit (MIB) performance. The gas thruster includes a thrust nozzle, a main stage, a main valve element, and a pilot valve. The gas thruster responds to thruster control signals supplied to the pilot valve and is configured such that for commands of relatively short duration, only the pilot valve responds and relatively low thrust is produced. Conversely, for command or relatively longer duration, the pilot valve and main valve element both respond and relatively higher thrust is produced.

18 Claims, 3 Drawing Sheets

LOW MINIMUM IMPULSE BIT PROPELLANT GAS THRUSTER

TECHNICAL FIELD

The present invention generally relates to propellant gas thrust control and, more particularly, to a propellant gas thruster that is relatively small and that exhibits a relatively low minimum impulse bit (MIB).

BACKGROUND

Propellant gas thrusters are used in rockets, missiles, interceptors, and various other vehicles and environments. For example, propellant gas thrusters may be used to control both vehicle propulsion, steering, lateral divert and attitude control for missiles, munitions, and various spacecraft. A propellant gas thruster typically receives high-energy propellant gas from, for example, a solid or liquid propellant gas generator. Depending upon the particular end-use system in which the propellant gas thruster is installed, propellant gas flow through the propellant gas thruster is preferably controlled to vary the thrust, pitch, yaw, roll, spin rate, and/or other dynamic characteristics of a vehicle in flight.

For some end-use systems, there is a need for a propellant gas thruster that is able to supply thrust in the range of 2 to 20 pound-force (lbf) with a small weight and electrical power allocation. It is furthermore desirable that the propellant gas thruster is sufficiently controllable to allow for propellant management, and that it exhibits a relatively fine impulse resolution (e.g., a relatively low minimum impulse bit (MIB) performance). Presently known propellant gas thruster configurations do not address this combination of needs. For example, poppet valve thrusters, due to the on-off behavior of a poppet valve, may be used to provide propellant management. However, poppet valve thrusters provide relatively high thrust levels and exhibit relatively coarse MIB performance. Another propellant gas thruster configuration uses pintle valves. Pintle valve thrusters provide a modulated output and exhibit thrust levels similar to poppet valve thrusters, but tend to have slower response times. One other known thruster configuration, which uses diverter valves, does supply thrust levels in the 2 to 20 lbf range and does exhibit favorable MIB performance. Unfortunately, because diverter valves supply a constant gas flow, diverter valve thrusters may not be used to provide propellant management.

Hence, there is a need for a propellant gas thruster that is able to supply thrust over a relatively wide range, from a relatively low value to a relatively high thrust value, and is sufficiently controllable to allow for propellant management, and that exhibits relatively fine MIB performance. The present invention addresses at least this need.

BRIEF SUMMARY

In one embodiment, and by way of example only, a gas thruster includes a thrust nozzle, a main stage, a main valve element, and a pilot valve. The thrust nozzle includes an inner surface that defines a flow plenum having an exhaust port. The main stage includes a gas inlet port, a thrust nozzle supply port, and a valve chamber. The main stage gas inlet port is adapted to receive a flow of pressurized gas. The main stage thrust nozzle supply port is in fluid communication with the thrust nozzle flow plenum. The valve chamber is defined at least in part by a stop surface. The main valve element is movably disposed within the main stage valve chamber, between the main stage thrust nozzle supply port and the stop surface, and defines a main stage actuation chamber. The main valve element is movable between an open position, in which the main stage gas inlet port is in fluid communication with the thrust nozzle flow plenum, and a closed position, in which the main stage gas inlet port is not in fluid communication with the thrust nozzle flow plenum. The pilot valve is coupled to the main stage and the thrust nozzle, and is in fluid communication with the thrust nozzle flow plenum, the main stage gas inlet port, and the main stage actuation chamber. The pilot valve is operable to selectively (i) fluidly couple the main stage gas inlet port to the main stage actuation chamber via the pilot valve, and simultaneously fluidly isolate the main stage actuation chamber from the thrust nozzle flow plenum via the pilot valve, and (ii) fluidly couple the main stage actuation chamber to the thrust nozzle flow plenum via the pilot valve, and simultaneously fluidly isolate the main stage gas inlet port from the main stage actuation chamber via the pilot valve.

In another exemplary embodiment, a solid propellant management control system includes a solid propellant gas generator, a controller, and a propellant gas thruster. The solid propellant gas generator has solid propellant disposed therein, and is configured to generate propellant gas upon being ignited. The controller is operable to selectively supply thruster control signals. The propellant gas thruster is coupled to receive propellant gas from the solid propellant gas generator. The propellant gas thruster is further coupled to receive the thruster control signals and is operable, in response thereto, to selectively generate a thrust. The propellant gas thruster a thrust nozzle, a main stage, a main valve element, and a pilot valve. The thrust nozzle includes an inner surface that defines a flow plenum having an exhaust port. The main stage includes a gas inlet port, a thrust nozzle supply port, and a valve chamber. The main stage gas inlet port is coupled to receive propellant gas from the gas generator. The main stage thrust nozzle supply port is in fluid communication with the thrust nozzle flow plenum. The valve chamber is defined at least in part by a stop surface. The main valve element is movably disposed within the main stage valve chamber, between the main stage thrust nozzle supply port and the stop surface, and defines a main stage actuation chamber. The main valve element is movable between an open position, in which the main stage gas inlet port is in fluid communication with the thrust nozzle flow plenum, and a closed position, in which the main stage gas inlet port is not in fluid communication with the thrust nozzle flow plenum. The pilot valve is coupled to the main stage and the thrust nozzle, and is in fluid communication with the thrust nozzle flow plenum, the main stage gas inlet port, and the main stage actuation chamber. The pilot valve is coupled to receive the thruster control signals and is operable, in response thereto, to selectively (i) fluidly couple the main stage gas inlet port to the main stage actuation chamber via the pilot valve, and simultaneously fluidly isolate the main stage actuation chamber from the thrust nozzle flow plenum via the pilot valve, and (ii) fluidly couple the main stage actuation chamber to the thrust nozzle flow plenum via the pilot valve, and simultaneously fluidly isolate the main stage gas inlet port from the main stage actuation chamber via the pilot valve.

Other independent features and advantages of the preferred propellant gas thruster and solid propellant management control system will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF VARIOUS PREFERRED EMBODIMENTS

The following detailed description is merely exemplary in nature and is not intended to limit the invention or the application and uses of the invention. Furthermore, there is no intention to be bound by any theory presented in the preceding background or the following detailed description. In this regard, although the systems and methods are described herein as being implemented in a vehicle, the systems and methods may also be used in energy storage and/or generation systems.

Figure 1:
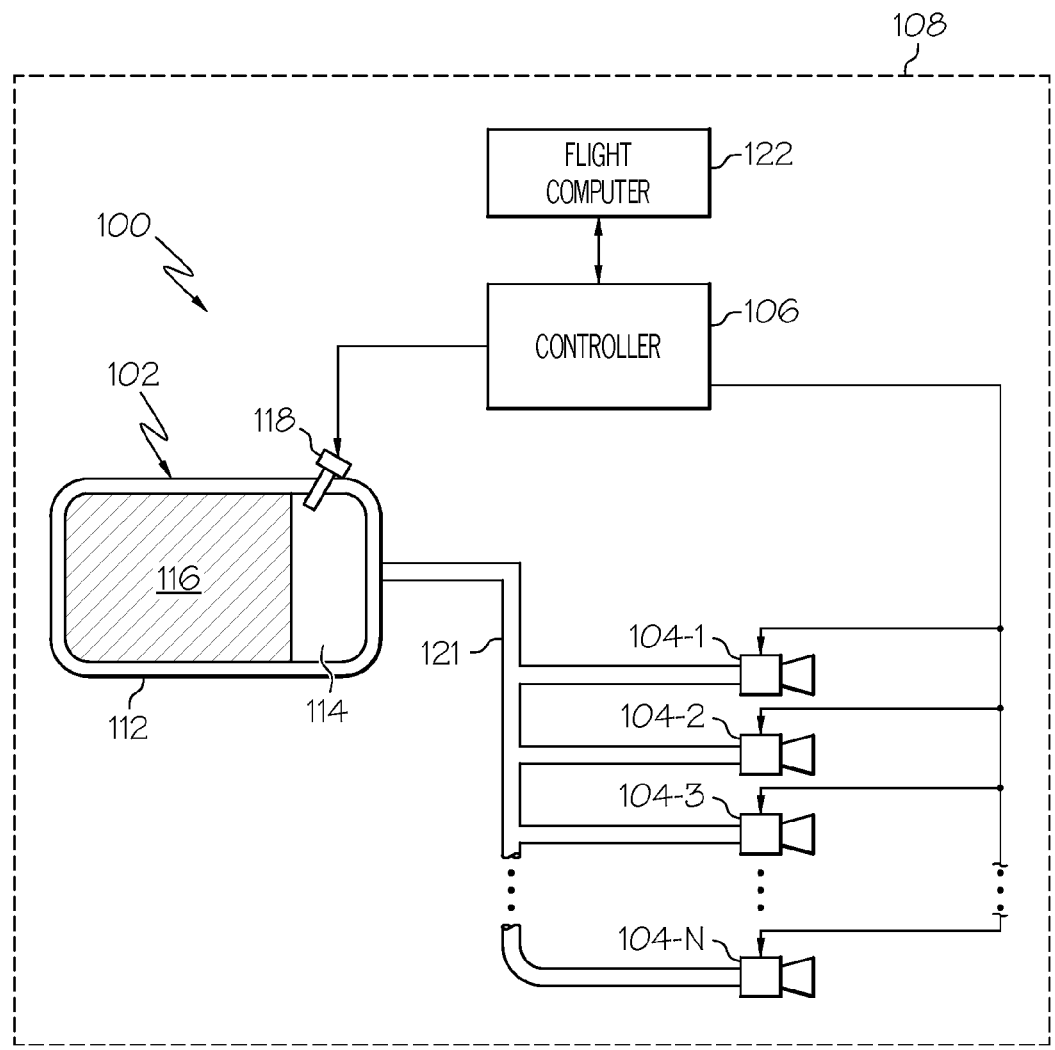
FIG. 1 is a functional block diagram of an exemplary embodiment of a solid propellant gas management system.

Turning first to FIG. 1, a functional block diagram of an exemplary embodiment of a solid propellant gas management system 100 is depicted. The system 100 includes a solid propellant gas generator 102, a plurality of gas thrusters 104 (e.g., 104-1, 104-1, 104-3, . . . 104-N), and a controller 106, which may all be disposed within a projectile body 108. Before proceeding further, it should be appreciated that the system 100 could be implemented with additional components and/or subsystems, not just those depicted and described herein. However, a description of these additional components and/or subsystems is not needed to fully describe or enable the claimed invention, and thus is not included.

Returning once again to the description of the system 100, the solid propellant gas generator 102 includes a vessel 112 that defines a combustion chamber 114 in which a solid propellant 116 is disposed. The manner in which the solid propellant 116 is formed and subsequently loaded into the combustion chamber 114 are generally well known, and will thus not be further discussed. Moreover, the particular type of solid propellant 116 may vary. Some non-limiting examples of solid propellant 116 include ammonium nitrate and ammonium perchlorate. No matter the particular solid propellant 116 that is used, upon being ignited by an igniter 118, the solid propellant 116 produces propellant gas, which is directed toward the gas thrusters 104 via, for example, a suitable manifold 121. It will be appreciated that the gas thrusters 104 may be configured to function as reaction control devices, main thrust devices, or both.

The gas thrusters 104 are each in fluid communication with the combustion chamber 114 via the manifold 121. The gas thrusters 104 are each coupled to receive thruster control signals from the controller 106, and are each responsive to the thruster control signals it receives to selectively generate a thrust. More specifically, and as will be described in more detail further below, each gas thruster 104 is responsive to the thruster control signals it receives from the controller 106 to control the flow of propellant gas therethrough in order to control the amount of thrust it produces. As will also be described in more detail below, the configuration of each gas thruster 104 is such that the thrust each produces varies over a relatively wide range, from a relatively low thrust (e.g., about 2 lbf) to a relatively high thrust (e.g., about 20 lbf).

The controller 106, at least in the depicted embodiment, is configured to supply an initiation signal to the igniter 118 and, as noted above, thruster control signals to the gas thrusters 104. The initiation signal supplied to the igniter 118 causes the igniter 118 to ignite the solid propellant 116, which in turn generates the propellant gas. It will be appreciated that in alternative embodiments the initiation signal could be supplied from other, non-illustrated devices or systems. The thruster control signals supplied to the gas thrusters 104 are used to control thrust, maneuvering, and/or propellant burn rate. For example, the controller 106 may selectively control the gas thrusters 104 to maximize axial vehicle thrust, to maximize an attitude or divert maneuver, or to maximize propellant burn rate. Preferably, the thruster control signals comprise pulses, with each pulse having a duty cycle. As will be described further below, the amount of thrust produced by each gas thruster 104 may be controlled by varying the duty cycle of the thruster control signal it receives.

As FIG. 1 also depicts, the controller 106 may also be in operable communication with a flight computer 122. The flight computer 122, which may be variously implemented and configured, is operable to supply flight control signals to the controller 106 that are at least representative of a commanded projectile flight path. The controller 106 is responsive to the flight control signals to selectively supply the reaction control signals and the throttling valve control signals. It will additionally be appreciated that the controller 106 and flight computer 122, and their associated functions, could be integrated into a single device.

Figure 2:
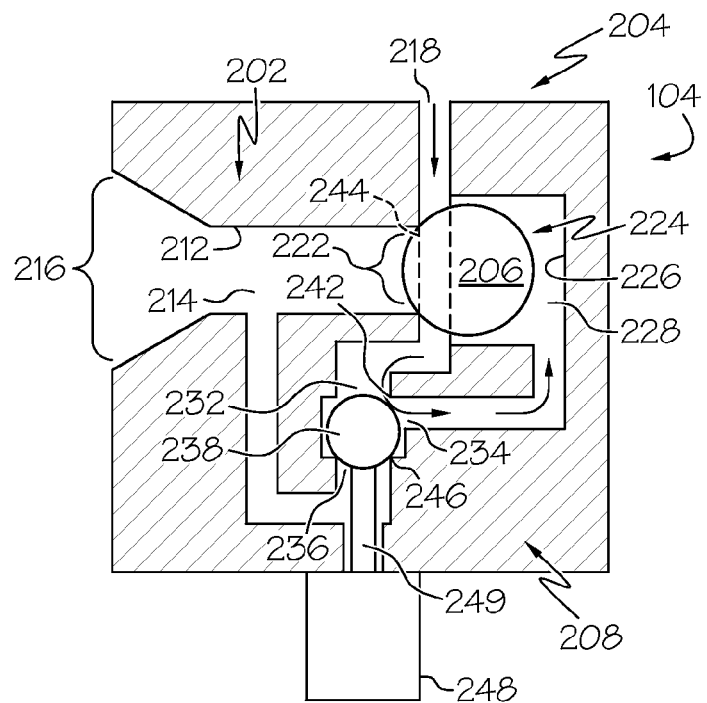
FIGS. 2-4 depict an exemplary embodiment of a gas thruster that may be used to implement the system of FIG. 1 in various operational configurations.

With reference now to FIG. 2, a simplified cross section view of an embodiment of a gas thruster 104 is depicted and will be described. The gas thruster 104 is depicted, for clarity and ease of illustration, as an integral device. It will be appreciated, however, that it could be implemented from two or more separate devices. In any case, the depicted gas thruster 104 includes a thrust nozzle 202, a main stage 204, a main valve element 206, and a pilot valve 208. The thrust nozzle 202 includes an inner surface 212 that defines a flow plenum 214 having an exhaust port 216. The cross sectional area of the thrust nozzle flow plenum 214, as is generally known, diverges toward the exhaust port 216.

The main stage 204 is coupled to the thrust nozzle 202, and includes a gas inlet port 218, a thrust nozzle supply port 222, and a valve chamber 224. The main stage gas inlet port 218, when installed in the system 100 of FIG. 1, is coupled to receive propellant gas from the solid propellant gas generator 102. The main stage thrust nozzle supply port 222 is in fluid communication with the thrust nozzle flow plenum 214, and the main stage valve chamber 224 is defined at least in part by a stop surface 226.

The main valve element 206 is movably disposed within the main stage valve chamber 224 between the main stage thrust nozzle supply port 222 and the main stage stop surface 226, and thereby defines a main stage actuation chamber 228. The main valve element 206 is movable between an open position and a closed position. In the closed position, which is the position depicted in FIG. 2, the main stage gas inlet port 218 is not in fluid communication with the thrust nozzle flow plenum 214 due to main valve element 206 contacting port 222. Conversely, in the open position, which is the position depicted in FIG. 3, the main stage gas inlet port 218 is in fluid communication with the thrust nozzle flow plenum 214 via open port 222.

Figure 3:
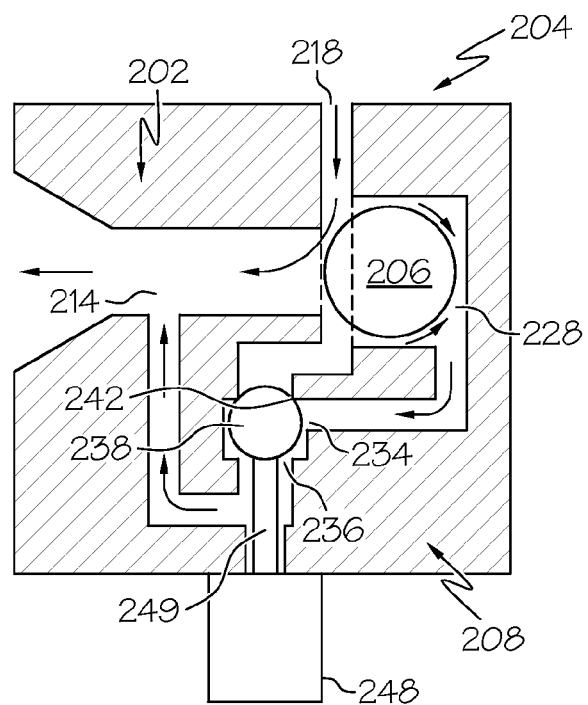

The pilot valve 208 is coupled to the thrust nozzle 202 and the main stage 204, and is in fluid communication with the thrust nozzle flow plenum 214, the main stage gas inlet port 218, and the main stage actuation chamber 228. The pilot valve 208 is coupled to receive thruster control signals from the controller 106 and is operable, in response to the thruster control signals, to move between a first position and a second position. In the first position, which is depicted in FIG. 2, the pilot valve 208 fluidly couples the main stage gas inlet port 218 to the main stage actuation chamber 228 via the pilot valve 208, and simultaneously fluidly isolates the main stage actuation chamber 228 from the thrust nozzle flow plenum 214 via the pilot valve. In the second position, which is depicted in FIG. 3, the pilot valve 208 fluidly couples the main stage actuation chamber 228 to the thrust nozzle flow plenum 214 via the pilot valve 208, and simultaneously fluidly isolates the main stage gas inlet port 218 from the main stage actuation chamber 228 via the pilot valve 208.

To implement the above-described functionality, the pilot valve 208 includes an inlet port 232, a control port 234, a vent port 236, and a pilot valve element 238. The pilot valve inlet port 232 is in fluid communication with the main stage gas inlet port 218 and defines a fill seat 242. In the depicted embodiment this fluid communication is provided via a flow annulus 244 (shown at least partially in phantom in FIGS. 2 and 3). As FIGS. 2 and 3 also show, the pilot valve control port 234 is in fluid communication with the main stage actuation chamber 228, and the vent port 236 is in fluid communication with the thrust nozzle flow plenum 214. The vent port 236 additionally defines a vent seat 246.

The pilot valve element 238 is movable between a first position and a second position. In the first position, which is depicted in FIG. 2, the pilot valve element 238 is seated against the vent seat 246. As a result, the pilot valve inlet port 232, and thus the main stage gas inlet port 218, is in fluid communication with the main stage actuation chamber 228, via and the pilot valve control port 234. Moreover, the main stage actuation chamber 228 is fluidly isolated from the pilot valve vent port 236, and thus is not in fluid communication with the thrust nozzle flow plenum 214 via the pilot valve 208. Conversely, when the pilot valve element 238 is in the second position, which is depicted in FIG. 3, the pilot valve element 238 is seated against the fill seat 242. As a result, the pilot valve inlet port 232, and thus the main stage gas inlet port 218, is not in fluid communication with the main stage actuation chamber 228 via the pilot valve 208. However, the main stage actuation chamber 228 is in fluid communication with the thrust nozzle flow plenum 214 via the pilot valve control port 234 and the pilot valve vent port 236.

The pilot valve element 238 is moved between the first and second positions by a valve actuator 248. Although the valve actuator 248 may be variously configured and implemented, in the depicted embodiment it is implemented using a solenoid-type valve actuator that is selectively energized and de-energized by the controller 106 to allow a shaft 249 to move between a retracted position and an extended position. The thrust control signals supplied by the controller 106 are preferably supplied to the valve actuator 248 (e.g., solenoid). As noted above, the thrust control signals comprise pulses, with each pulse having a duty cycle. It may thus be appreciated that when the thrust control signal is in a logic-high state the solenoid 248 is energized, and when the thrust control signal is in a logic-low state the solenoid 248 is de-energized. The solenoid 248 is configured such that when it is de-energized, the shaft 249 is retracted and the pilot valve element 238 is moved to the first position (FIG. 2), and when the solenoid 248 is energized, the shaft 249 is extended and the pilot valve element 238 is moved to the second position (FIG. 3). It is noted that the logic could be reversed, for reasons or operational advantage, such de-energized would be position two, and energized would be position one.

Having described an embodiment of each of the gas thrusters 104 from a structural standpoint, and the operation of the individual elements that make up the gas thrusters 104, a description of the overall operation of the gas thrusters 104 will now be provided. In doing so, reference should be made to FIGS. 2 and 3, as appropriate. Referring first to FIG. 2, when the solenoid 248 is de-energized (e.g., thrust control signal from the controller 106 is in a logic-low state), propellant gas pressure moves the pilot valve element 238 onto the vent seat 246. As a result, propellant gas pressure is routed through the control port 234 and to the main stage actuation chamber 228. The propellant gas pressure in the actuation chamber exerts a force on the backside of the main valve element 206. It may additionally be seen that propellant gas pressure, via the main stage gas inlet port 218 and the pilot valve inlet port 232, also exerts a force on a portion of the front side of the main valve element 206. The remainder of the front side of the main valve element 206 is exposed the pressure in the thrust nozzle flow plenum 214 (e.g., ambient pressure). The sum of the pressure forces acting on the main valve element 206 seats the main valve element 206 against the main stage thrust nozzle supply port 222. In this state, no propellant gas flows from either the main stage 204 or the pilot valve 208, and the gas thruster 104 produces no thrust.

When the solenoid 248 is energized, as shown in FIG. 3, the pilot valve element 238 is positioned on the fill seat 242. As a result, the main stage actuation chamber 228 is vented to the thrust nozzle flow plenum 214 via the pilot valve control port 234 and the pilot valve vent port 236. Thus, the pressure in the main stage actuation chamber 228 is greatly reduced, and a greatly reduced pressure force is exerted on the back side of the main valve element 206. In this state, the overall pressure force exerted on the main valve element 206 is reversed, and is moved away from the main stage thrust nozzle supply port 222 and toward the main stage stop surface 226. As the main valve element 206 moves away from the main stage nozzle supply port 222, the main stage gas inlet port 218 is fluidly coupled to the thrust nozzle flow plenum 214, which allows propellant gas to flow into and through the thrust nozzle 202 to produce thrust. As propellant gas pressure in the thrust nozzle flow plenum 214 builds due to propellant gas flow through the thrust nozzle 202, the pressure force on the front side of the main valve element 206 increases.

It is noted that the main stage valve chamber 224 and the main valve element 206, at least in the preferred embodiment, are dimensioned to define a gas leakage clearance. Thus, when the main valve element 206 is the open position, there is some propellant gas leakage flow between the main valve element 206 and the main stage valve chamber 224. This propellant gas leakage flow is directed through the pilot valve 208, via the pilot valve control port 234 and the pilot valve vent port 236. This causes the propellant gas pressure in the main stage actuation chamber 228 to be less than the supply pressure of the propellant gas but greater than the gas pressure in the thrust nozzle flow plenum 214. The propellant gas pressure in the main stage actuation chamber 228 is set by the ratio between the area of the gas leakage clearance and the area of the pilot valve vent port 236. In a particular preferred embodiment, this ratio is set so that the propellant gas pressure in the main stage actuation chamber 228 is roughly half the supply pressure of the propellant gas.

The gas thruster 104 is additionally configured such that when the main valve element 206 is in the open position the propellant gas pressure in the thrust nozzle flow plenum 214 is substantially less than the propellant gas supply pressure.

This ensures proper propellant gas flow from the main stage actuation chamber 228, through the pilot valve 208, to the thrust nozzle flow plenum 214. This pressure is controlled through proper sizing of the nozzle throat relative to the area of the main stage nozzle supply port 222. The area of the main stage nozzle supply port 222, which defines a main valve seat for the main valve element 206, is in turn controlled by the stroke of the main valve element 206 and the diameter of the main valve seat. This also controls the pressure balance of the main valve element 206. In a particular preferred embodiment, the gas thruster 104 is configured such that when the main valve element 206 is in the open position the propellant gas pressure in the thrust nozzle flow plenum 214 is roughly one fourth the propellant gas supply pressure.

When the solenoid 248 is subsequently de-energized, propellant gas pressure moves the pilot valve element 238 back onto the vent seat 246. As a result, propellant gas pressure in the main stage actuation chamber 228 builds to a point where the pressure force acting on the main valve element 206 moves the main valve element 206 back toward the main stage nozzle supply port 222. This operation is able to occur even while propellant gas pressure in the thrust nozzle flow plenum 214 is elevated due to existing flow.

Figure 4:
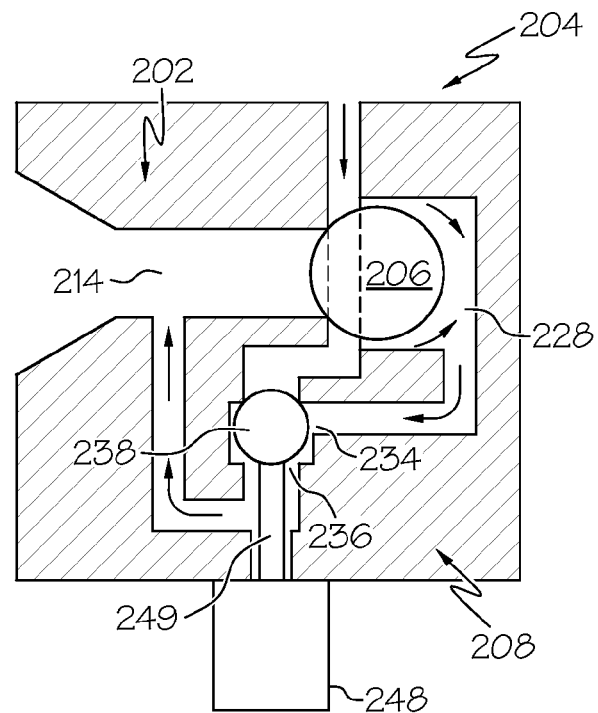

The gas thruster 104 responds as described in the above paragraphs whenever the solenoid 248 is energized for at least a predetermined time (e.g., the duty cycle of the thrust control signal exceeds a predetermined value), and thus the pilot valve element 238 is moved to the second position for the predetermined time. It is noted, however, that whenever the controller 106 supplies thrust control signals having a duty cycle less than the predetermined duty cycle (e.g., the solenoid 248 is energized for less than the predetermined time), then only the pilot valve 208 will respond. This is because there is insufficient time for the gas pressure in the main stage actuation chamber 228 to decay to a level so as to upset the force balance on main valve element 206 and for said element to accelerate off the main valve seat. The response of the gas thruster 104 to such commands is depicted in FIG. 4. As shown therein, propellant gas is supplied (for a relatively short time duration) to the thrust nozzle 202 from the main stage actuation chamber 228, via the pilot valve control port 234 and the pilot valve vent port 236. This response results in relatively short and relatively low flow propellant gas pulses, which allows the gas thruster 104 to exhibit relatively fine MIB performance.

Figure 5:
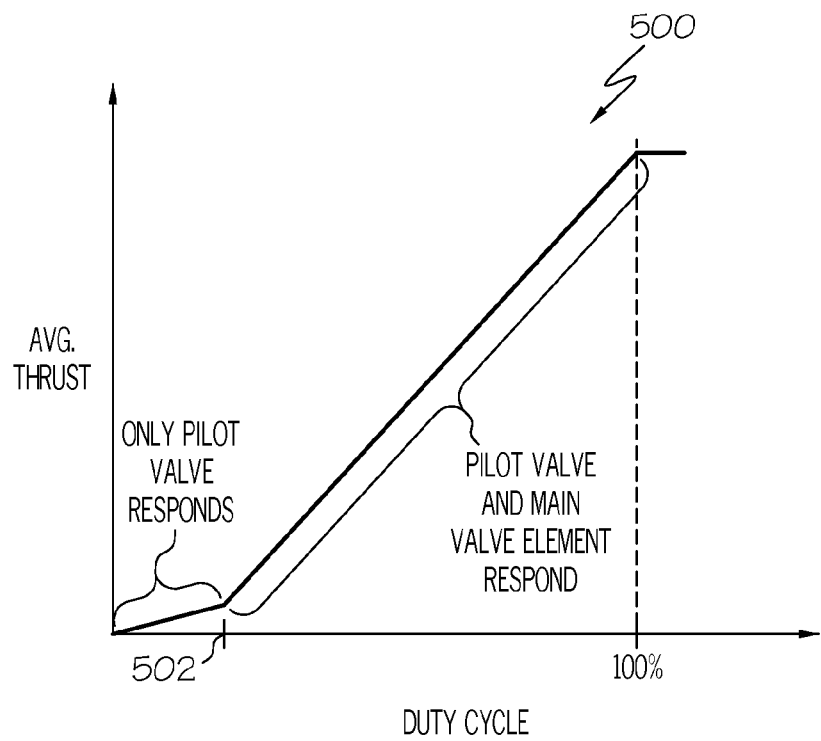
FIG. 5 is a graph that depicts time-averaged thrust versus pulse-width-modulated duty cycle exhibited by the exemplary gas thruster of FIGS. 2-4.

The gas thruster 104 described herein is capable of producing thrust over a relatively wide range. For example, it can produce thrust from about 2 lbf to about 20 lbf. The amount of thrust the gas thruster 104 produces may depend, as described above, upon the duty cycle of the pulse-width-modulated thrust control signals supplied to the pilot valve actuator 248. The thrust control signal duty cycle more specifically determines whether only the pilot valve 208 responds or whether both the pilot valve 208 and main valve element 206 will respond. This operational characteristic is graphically depicted in FIG. 5, in which the time-average thrust produced by a gas thruster 104 is plotted against the duty cycle of the thrust control signals supplied to the pilot valve actuator 248. This graph 500 clearly shows that for relatively short duty cycles (e.g., less than the predetermined duty cycle 502) only the pilot valve 208 responds, and the average thrust is relatively low. Conversely, for relatively longer duty cycles (e.g., greater than the predetermined duty cycle 502) the pilot valve 208 and main valve element 206 both respond, and the average thrust increases significantly as the duty cycle increases from the predetermined duty cycle to a 100% duty cycle. As used herein, "duty cycle" refers to the fraction of "on" time relative to the time period (inverse of the pulsing frequency) of the pulse-width-modulated commands issues from the controller.

The gas thruster disclosed herein is to supply thrust over a relatively wide range, from a relatively low value to a relatively high thrust value, and exhibits relatively fine MIB performance. The gas thruster and system also provide for the selective or collective control of solid propellant burn rate, combustion chamber pressure and propellant gas flow. The gas thruster and system thus conserve propellant utilization, which can extend burn duration, range, and mission flexibility of projectile systems and backup power systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas thruster, comprising:
   a thrust nozzle including an inner surface that defines a flow plenum having an exhaust port;
   a main stage including a gas inlet port, a thrust nozzle supply port, and a valve chamber, the main stage gas inlet port adapted to receive a flow of pressurized gas, the main stage thrust nozzle supply port in fluid communication with the thrust nozzle flow plenum, the valve chamber defined at least in part by a stop surface;
   a main valve element movably disposed within the main stage valve chamber between the main stage thrust nozzle supply port and the stop surface and defining a main stage actuation chamber, the main valve element movable between an open position, in which the main stage gas inlet port is in fluid communication with the thrust nozzle flow plenum, and a closed position, in which the main stage gas inlet port is not in fluid communication with the thrust nozzle flow plenum; and
   a pilot valve coupled to the main stage and the thrust nozzle, and including an inlet port, a control port, a vent port, and a pilot valve element, the pilot valve vent port in continuous fluid communication with the thrust nozzle flow plenum, the pilot valve inlet port in continuous fluid communication with the main stage gas inlet port, and the pilot valve control port in continuous fluid communication with the main stage actuation chamber, the pilot valve operable to selectively element movable between a first position and a second position, wherein:
   (i) in the first position, the pilot valve fluidly couples the main stage gas inlet port and the pilot valve inlet port to the pilot valve control port and to the main stage actuation chamber, and simultaneously fluidly isolates the main stage actuation chamber from the pilot valve vent port and the thrust nozzle flow plenum, and
   (ii) in the second position, the pilot valve fluidly couples the main stage actuation chamber to the pilot valve vent port and to the thrust nozzle flow plenum, and simultaneously fluidly isolates the main stage gas inlet port from the pilot valve control port and from the main stage actuation chamber.

2. The gas thruster of claim 1, wherein the main valve element is responsive to gas pressure forces supplied thereto from the main stage actuation chamber and at least the thrust nozzle flow plenum to move between the open and closed positions.

3. The gas thruster of claim 1, wherein the main valve element comprises a spherical element freely disposed within the main stage valve chamber.

4. The gas thruster of claim 1, wherein the main valve element comprises a substantially disc-shaped element freely disposed within the main stage valve chamber.

5. The gas thruster of claim 1, wherein:
the main stage valve chamber and the main valve element are sized to define a gas leakage clearance therebetween; and
when the main valve element is in the open position, and pressurized gas is supplied to the main stage gas inlet port, a portion of the pressurized gas flows through the leakage clearance into the actuation chamber.

6. The gas thruster of claim 1, wherein at least the main stage and the main valve element are configured such that the main valve element moves from the closed position to the open position when the main stage actuation chamber is fluidly coupled to the thrust nozzle flow plenum via the pilot valve and the main stage gas inlet port is simultaneously fluidly isolated from the main stage actuation chamber via the pilot valve for at least a predetermined time.

7. The gas thruster of claim 1, further comprising:
a valve actuator coupled to the pilot valve element and operable to move the pilot valve element between the first and second positions.

8. The gas thruster of claim 7, wherein the valve actuator comprises a solenoid.

9. A solid propellant management control system, comprising:
a solid propellant gas generator having solid propellant disposed therein, the solid propellant configured to generate propellant gas upon being ignited;
a controller operable to selectively supply thruster control signals; and
a propellant gas thruster coupled to receive propellant gas from the solid propellant gas generator, the propellant gas thruster further coupled to receive the thruster control signals and operable, in response thereto, to selectively generate a thrust, the propellant gas thruster comprising:
a thrust nozzle including an inner surface that defines a flow plenum having an exhaust port,
a main stage including a gas inlet port, a thrust nozzle supply port, and a valve chamber, the main stage gas inlet port coupled to receive propellant gas from the gas generator, the main stage thrust nozzle supply port in fluid communication with the thrust nozzle flow plenum, the valve chamber defined at least in part by a stop surface,
a main valve element movably disposed within the main stage valve chamber between the main stage thrust nozzle supply port and the stop surface and defining a main stage actuation chamber, the main valve element movable between an open position, in which the main stage gas inlet port is in fluid communication with the thrust nozzle flow plenum, and a closed position, in which the main stage gas inlet port is not in fluid communication with the thrust nozzle flow plenum, and
a pilot valve coupled to the main stage and the thrust nozzle, and including an inlet port, a control port, a vent port, and a pilot valve element, the pilot valve vent port in continuous fluid communication with the thrust nozzle flow plenum, the pilot valve inlet port in continuous fluid communication with the main stage gas inlet port, and the pilot valve control port in continuous fluid communication with the main stage actuation chamber, the pilot valve operable to selectively element movable between a first position and a second position, wherein:
(i) in the first position, the pilot valve fluidly couples the main stage gas inlet port and the pilot valve inlet port to the pilot valve control port and to the main stage actuation chamber, and simultaneously fluidly isolates the main stage actuation chamber from the pilot valve vent port and the thrust nozzle flow plenum, and
(ii) in the second position, the pilot valve fluidly couples the main stage actuation chamber to the pilot valve vent port and to the thrust nozzle flow plenum, and simultaneously fluidly isolates the main stage gas inlet port from the pilot valve control port and from the main stage actuation chamber.

10. The system of claim 9, wherein:
the thruster control signals comprise pulses, each pulse having a duty cycle; and
the propellant gas thruster is configured such that, when propellant gas is supplied from the solid propellant gas generator to the propellant gas thruster:
(i) for pulses having a duty cycle less than a predetermined duty cycle value, the pilot valve is responsive and the main valve remains in the closed position, and
(ii) for pulses having a duty cycle greater than the predetermined duty cycle value, the pilot valve and main valve are responsive.

11. The system of claim 9, wherein the controller is further operable to selectively supply the thrust control signals to control solid propellant burn rate.

12. The system of claim 9, wherein the controller is further operable to selectively supply the thruster control signals to control propellant gas pressure in the solid propellant gas generator.

13. The system of claim 9, wherein the controller is further operable to selectively supply the thruster control signals to control generation of propellant gas pressure pulses in the solid propellant gas generator.

14. The system of claim 9, wherein, when propellant gas is supplied to from the solid propellant gas generator:
the main valve element is in the closed position when the main stage gas inlet port to is fluidly coupled the main stage actuation chamber via the pilot valve, and the main stage actuation chamber is simultaneously fluidly isolated from the thrust nozzle flow plenum via the pilot valve, and
the main valve element is moved from the closed position to the open position when, for at least a predetermined period of time, the main stage actuation chamber is fluidly coupled to the thrust nozzle flow plenum via the pilot valve, and the main stage gas inlet port is simultaneously fluidly isolated from the main stage actuation chamber via the pilot valve.

15. The system of claim 9, wherein the main valve element is responsive to propellant gas pressure forces supplied thereto from the main stage actuation chamber and at least the thrust nozzle flow plenum to move between the open and closed positions.

16. The system of claim 9, wherein:

the main valve element is freely disposed within the main stage valve chamber; and the main valve element is selected from the group consisting of a spherical element and a substantially disc-shaped element.

17. The system of claim 9, wherein:

the main stage valve chamber and the main valve element are sized to define a gas leakage clearance therebetween; and when the main valve element is in the open position, and propellant gas is supplied to the main stage gas inlet port, a portion of the propellant gas flows through the leakage clearance into the actuation chamber.

18. The system of claim 9, further comprising:

a solenoid-operated valve actuator coupled to the pilot valve element, the solenoid-operated valve actuator coupled to receive the thruster control signals and operable, in response thereto, to move the pilot valve element between the first and second positions.

* * * * *